United States Patent [19]

Komiyama

[11] Patent Number: 4,629,329
[45] Date of Patent: Dec. 16, 1986

[54] ELECTRONIC WRISTWATCH

[75] Inventor: Katsuhiko Komiyama, Tanashi, Japan

[73] Assignee: Citizen Watch Co., Ltd., Tokyo, Japan

[21] Appl. No.: 727,215

[22] Filed: Apr. 25, 1985

[30] Foreign Application Priority Data

Apr. 26, 1984 [JP] Japan ................... 59-84984

[51] Int. Cl.⁴ ............................ G04B 47/00
[52] U.S. Cl. ..................... 368/10; 368/204
[58] Field of Search ............ 368/10, 203, 204

[56] References Cited

U.S. PATENT DOCUMENTS 2,771,559 11/1956 Montmeat ................ 368/10
3,032,651 5/1962 Gisiger-Stahl et al. ........ 368/10

FOREIGN PATENT DOCUMENTS 106380 8/1980 Japan ..................... 368/10

Primary Examiner—Bernard Roskoski
Attorney, Agent, or Firm—Brich, Stewart Kolasch and Birch

[57] ABSTRACT

An electronic wristwatch has a capability to carry out a function other than timekeeping. For example, the wristwatch may have the ability to perform as a radio. The wristwatch comprises a main unit provided with an electronic watch unit, plus a radio receiver, and an auxiliary unit provided with a battery for driving the radio receiver. The auxiliary unit is detachably coupled to the main unit.

13 Claims, 11 Drawing Figures

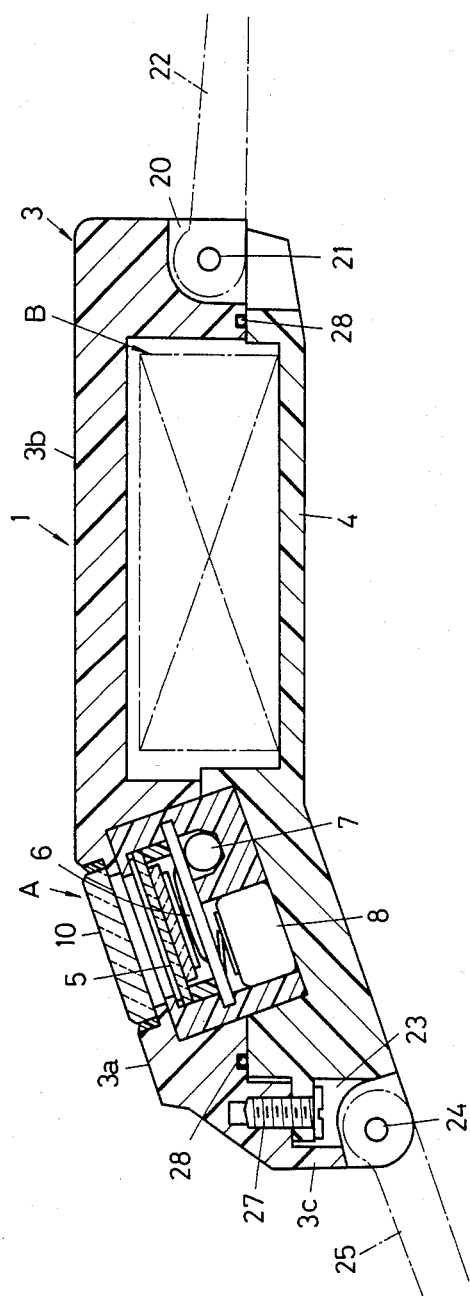

ELECTRONIC WRISTWATCH

BACKGROUND OF THE INVENTION

The present invention relates to an electronic wristwatch having an additional electronic device such as a radio, television, and others.

Recently, an electronic wristwatch with an additional electronic capability to carry out a function other than timekeeping. For example, the wristwatch may have the ability to perform as a radio or a thermometer has been sold. Such an additional electronic device is provided with large batteries, since it consumes more electric power than the electronic wristwatch consumes when keeping time. Accordingly, the wristwatch becomes such a large size as to make it unsuitable to wear.

On the other hand, in the case that an earphone jack is provided on the wristwatch, it is necessary to design the watch so as to prevent contacts of the jack from corrosion by water and perspiration.

SUMMARY OF THE INVENTION

Accordingly, it is an object of the present invention to provide an electronic wristwatch having additional electronic devices for functions other than timekeeping, which may be reduced in size when the watch is used for timekeeping only.

Another object of the present invention is to provide an electronic wristwatch in which earphone jacks may be prevented from corrosion.

A further object of the present invention is to provide an electronic wristwatch in which batteries for the electronic equipment can be easily replaced.

According to the present invention, there is provided an electronic wristwatch comprising a main unit comprising a case and a back and provided with an electronic watch unit, with an additional electronic device having at least one function other than timekeeping, and with bands for wearing the wristwatch; and auxiliary unit provided with a battery for driving the electronic device; first means for detachably coupling the auxiliary unit to the main unit; and second means for electrically connecting the main unit and the auxiliary unit.

In an aspect of the present invention, the auxiliary unit is coupled to the left side of the main unit. The auxiliary unit comprises a case and a cover detachably secured to the case.

These and other objects and features of the present invention will become more apparent from the following description with reference to the accompanying drawings.

BRIEF DESCRIPTION OF THE DRAWINGS

FIG. 8 is a longitudinal sectional view of the main unit, taken along a line VIII—VIII of FIG. 9;

DESCRIPTION OF THE PREFERRED EMBODIMENTS

Figure 1:
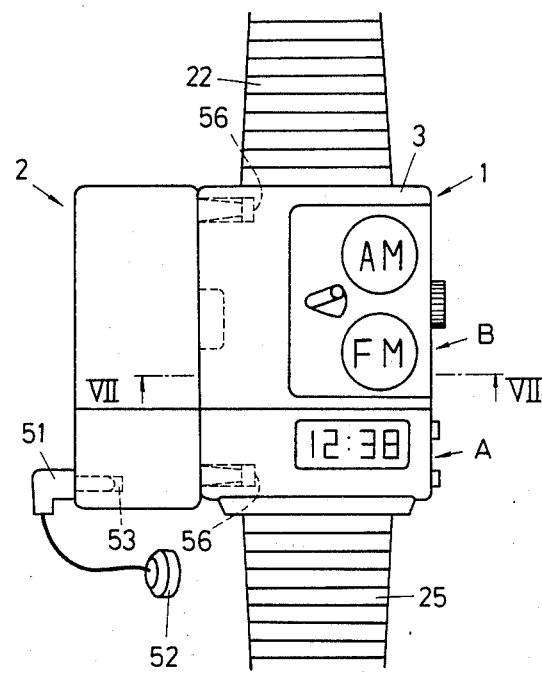
FIG. 1 is a plan view showing an electronic wristwatch according to the present invention.
Figure 3:
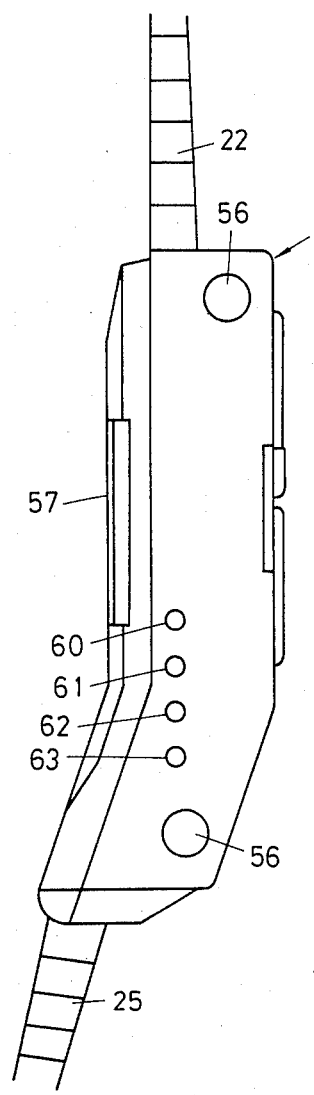
FIG. 3 is an elevational view of the main unit of FIG. 2.

Referring to FIG. 1, an electronic wristwatch according to the present invention comprises a main unit 1 and an auxiliary unit 2 detachably connected to the main unit. As shown in FIG. 8, the main unit 1 is provided in a case 3 closed by a back 4 which are made of plastic. The case 3 is bent to form an inclined portion 3a as viewed from a lateral side. The main unit 1 comprises an electronic watch unit A and a radio receiver unit B as an electronic unit that has a function other than timekeeping. As shown in FIG. 8, the electronic watch unit A is provided in the inclined portion 3a, and comprises a digital electronic watch having a liquid crystal display device 5, IC 6, crystal oscillator 7 and battery 8. A glass 10 for the liquid crystal display device 5 is provided in a surface of the inclined portion 3a.

Figure 2:
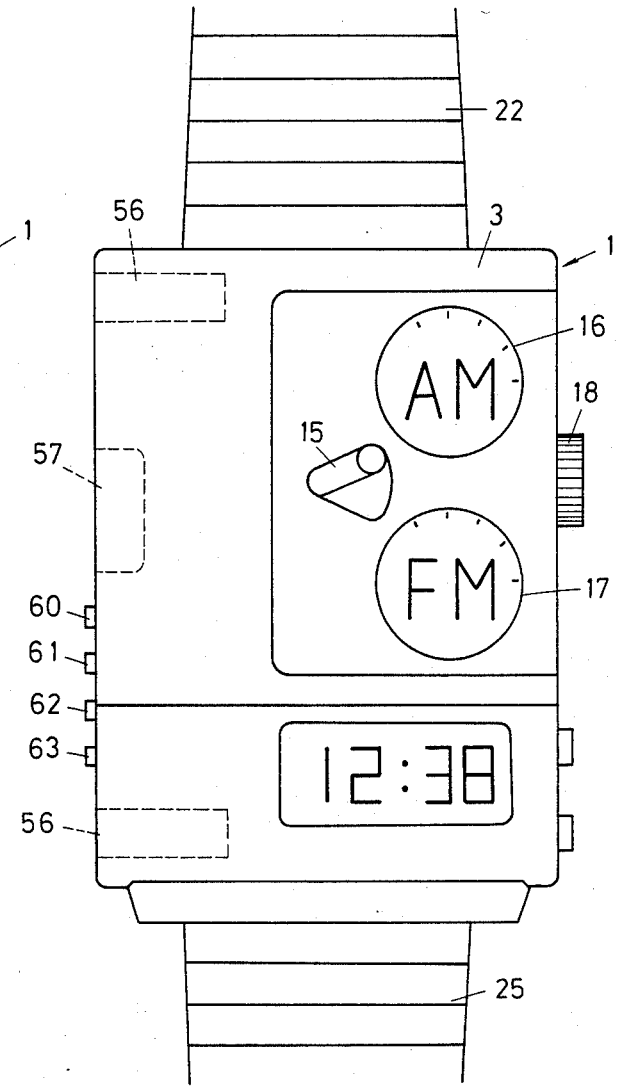
FIG. 2 is an enlarged plan view showing a main unit of the wristwatch.
Figure 7:
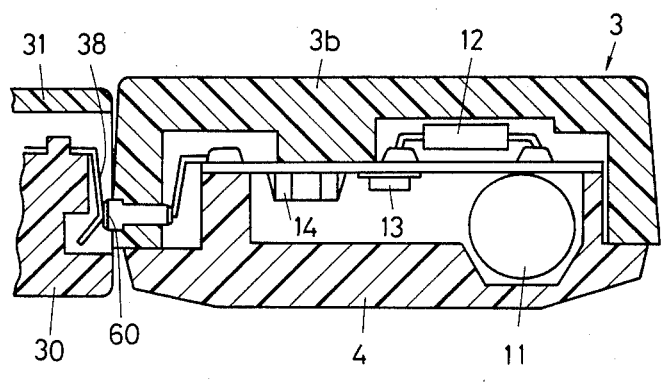
FIG. 7 is a transverse sectional view taken along a line VII—VII of FIG. 1, showing a part of the wristwatch.

The radio receiver unit B is provided in a horizontal portion 3b, and comprises an antenna 11, IC 12, transistor 13, capacitor 14 (FIG. 7), switch 15 for selecting AM and FM, AM tuning dial 16, FM tuning dial 17, and volume control knob 18 (FIG. 2). The antenna is made by winding a wire on a bar.

Figure 9:
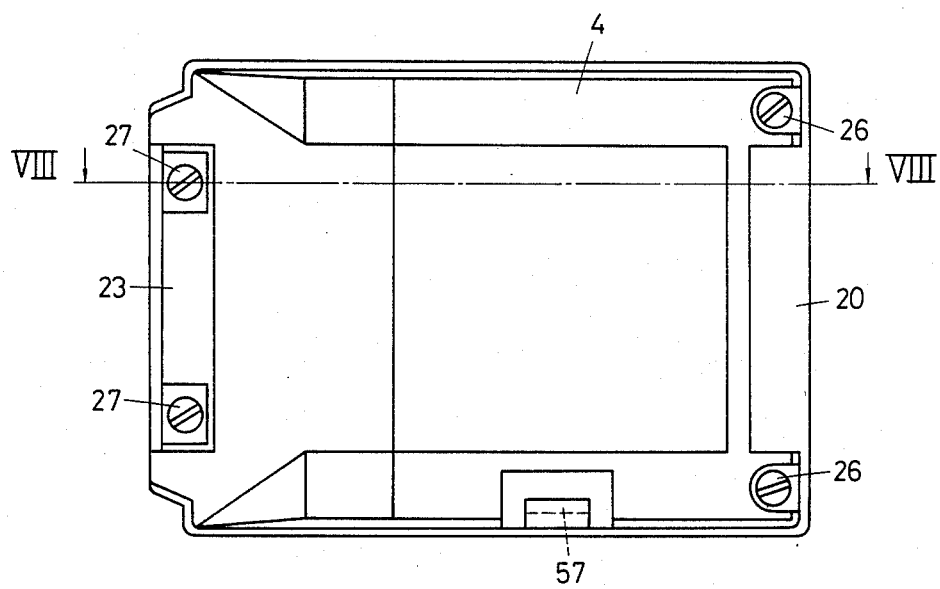
FIG. 9 shows a backside of the main unit.

Referring to FIGS. 8 and 9, the case 3 has a recess 20 at the end of the horizontal portion 3b and a pair of holes 21 for connecting a band 22 by a pin (not shown). The back 4 has a recess 23 at the end of the inclined portion 3a and has a pair of holes 24 for connecting the other band 25 by a pin (not shown). The back 4 is secured to the case 3 by a pair of screws 26 at portions outside the recess 20 and by a pair of screws 27 at portions in the recess 23. A packing material 28 is provided between the case and the back for sealing the case. The case 3 has a skirt 3c for shading the screws 27.

Since the screws 27 are positioned in the recess 23, the width of the case 3 and back 4 can be reduced as seen from FIG. 9.

Figure 4:
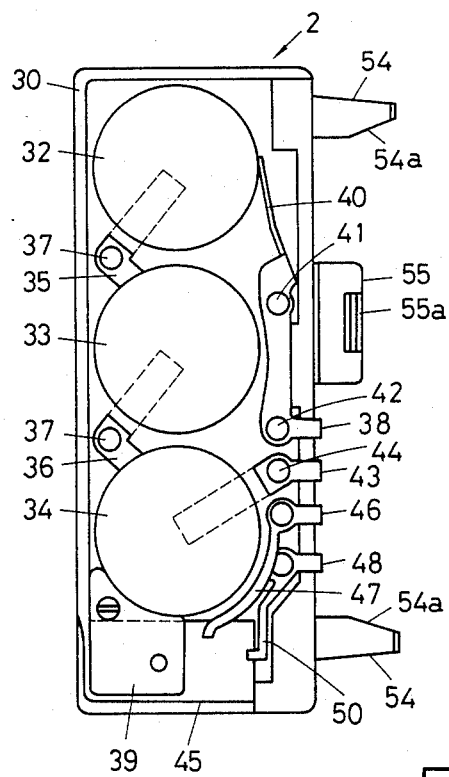
FIG. 4 is a plan view showing an inside of an auxiliary unit of the wristwatch.
Figure 5:
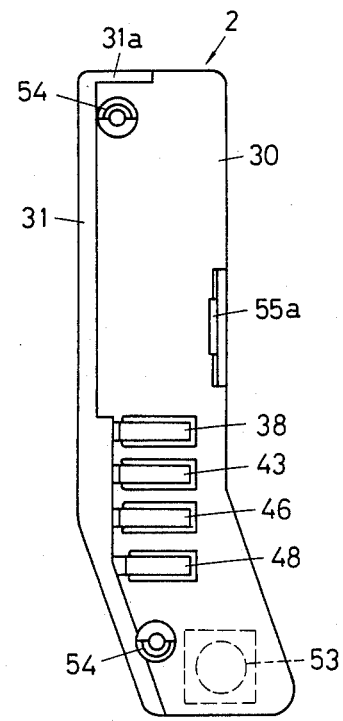
FIG. 5 is an elevational view of the auxiliary unit.

Referring to FIGS. 4 and 5, the auxiliary unit 2 is provided in a case 30 closed by a cover 31 which are made of plastic. The cover 31 is detachably secured to the case at a bent end 31a by a well known snap fastening means. The size and contour at the lateral side are substantially the same as the main unit 1, as shown in FIG. 5. In the case 30, three batteries 32, 33 and 34 as a source for the radio receiver unit B are disposed on the straight as shown in FIG. 4. The batteries are connected in series by elastic lead plates 35 and 36 which are mounted on studs 37 projected from the case and secured thereto by thermally deforming the top of each stud 37. The positive electrode of the battery 32 is connected to a positive terminal plate 38 by an elastic lead plate 40 secured by studs 41 and 42. Negative electrodes of batteries 32 and 33 are connected to positive electrodes of batteries 33 and 34 by lead plates 35 and 36, respectively. The negative electrode of the battery 34 is connected to a negative terminal plate 43 secured by a stud 44. Terminal plates 38, 43, 46 and 48 are bent to be exposed on the right side wall of the unit and to have elasticity.

In an end of the case 30, an earphone jack 45 is secured by a holding plate 39. One of contacts of the jack is connected to terminal plate 46 by a lead plate 47 and the other contact is connected to another terminal plate 48 by a lead plate 50. A plug 51 (FIG. 1) of an earphone 52 is adapted to be inserted into a hole 53 and engaged with the contacts of the jack.

Figure 6:
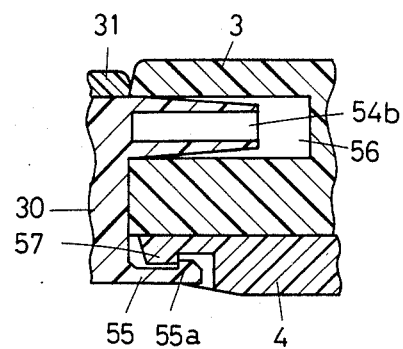
FIG. 6 is a sectional view showing junction structures of both units.

The case 30 has a pair of connecting projections 54 and a coupling 55 having a hook 55a at the right side thereof (FIG. 6). Each projection 54 has a slant 54a and a hole 54b therein. The batteries 32-34 can be easily replaced by removing the cover 31.

On the other hand, the main unit 1 has, at the left side thereof, a pair of holes 56 corresponding to connecting projections 54, hook portion 57 to be engaged with the hook 55a, and terminal rods 60, 61, 62 and 63 corresponding to terminal plates 38, 43, 46 and 48 of the auxiliary unit 2. Each of terminal rods 60-63 is embedded in the case 3 at the molding of the case. Terminal rods 60 and 61 are connected to an input circuit and ground of the radio receiver and terminal rods 62 and 63 are connected to outputs of the receiver.

The main unit 1 is worn on the wrist of the left hand by bands 22 and 25, positioning the watch unit A at the right side on the wrist. The inclined surface of the watch unit is convenient for learning the time. In order to turn on the radio, the auxiliary unit 2 is attached to the main unit 1 by engaging projections 54 and hook 55a with holes 56 and hook portion 57. By the attachment of the auxiliary unit 2, terminal plates 38, 43, 46 and 48 are pressed to terminal rods 60-63 to perform the electric connection between both units. Thus, the radio operates by the supply of current from the batteries 32-34. When the radio is not used, auxiliary unit 2 is detached from main unit 1 by disengaging the hook 55a from the hook 57. By slants 54a of projections 54, the detachment can be easily done, if the unit 2 is tilted.

Since the earphone jack 45 is provided in the auxiliary unit 2 and the unit is attached only when the radio is used, corrosion of contacts of the jack hardly occurs and the size of the main unit, which is usually used, can be reduced.

Figure 10:
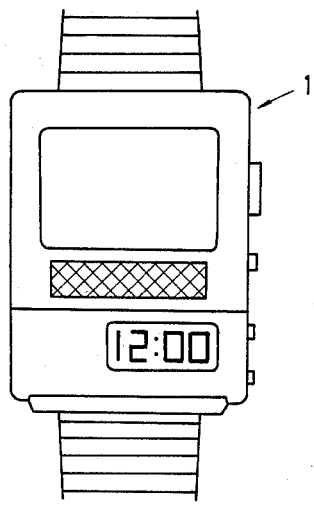
FIGS. 10 and 11 are plan views showing other embodiments of the present invention.
Figure 11:
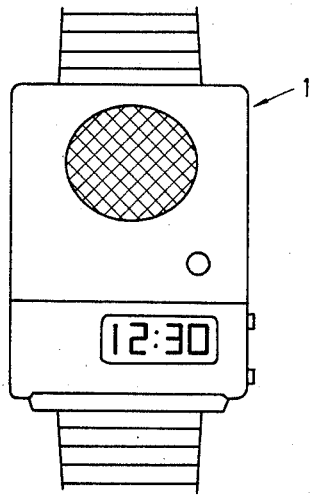

FIG. 10 shows another embodiment of the present invention. The main unit 1 has a television receiver. In the embodiment of FIG. 11, the main unit is provided with a transceiver.

While the invention has been described in conjunction with preferred specific embodiments thereof, it will be understood that this description is intended to illustrate and not limit the scope of the invention, which is defined by the following claims.

What is claimed is:

1. An electronic wristwatch, comprising:
   a main unit including,
      an electronic timekeeping unit,
      first battery means for powering said electronic timekeeping unit, and
      a secondary electronic unit to perform at least one function other than timekeeping;
   an auxiliary unit including a second battery means for powering said secondary electronic unit;
   coupling means for detachably physically coupling said auxiliary unit and said main unit; and
   terminal means for electrically connecting said secondary electronic unit to said second battery means.

2. The electronic wristwatch according to claim 1 wherein said auxiliary unit is coupled to the left side of the main unit.

3. The electronic wristwatch according to claim 1 wherein said auxiliary unit further includes a tertiary electronic unit that operates in conjunction with said secondary electronic unit to perform said at least one function other than timekeeping.

4. The electronic wristwatch according to claim 1 wherein the auxiliary unit comprises a case and a cover detachably secured to the case.

5. The electronic wristwatch according to claim 1 wherein said coupling means comprises a first hook and a plurality of projections provided on said auxiliary unit and a second hook and a plurality of holes provided in the main unit, with each of said plurality of holes engaging with one of said plurality of projections, and with said first and second hooks engaging each other.

6. The electronic wristwatch according to claim 1 wherein said terminal means comprises a plurality of elastic terminal plates disposed on said auxiliary unit, and a plurality of terminals disposed on said main unit, each of said plurality of terminals corresponding to and engaging one of said plurality of terminal plates.

7. The electronic wristwatch according to claim 1 wherein said secondary electronic unit is a radio receiver.

8. The electronic wristwatch according to claim 1 wherein said secondary electronic unit is a television receiver.

9. The electronic wristwatch according to claim 1 wherein said secondary electronic unit is a transceiver.

10. The electronic wristwatch according to claim 1 further comprising two bands to facilitate wearing the wristwatch, wherein one of the bands is connected to said case and the other is connected to said back.

11. The electronic wristwatch according to claim 1 wherein said main unit has an inclined portion at a longitudinal end portion, and the electronic watch is provided in the inclined portion.

12. The electronic wristwatch according to claim 1 wherein said tertiary electronic unit includes an output terminal for said secondary electronic unit.

13. The electronic wristwatch of claim 1 wherein said main unit further comprises a case having a face, and a back attached to said case.

* * * * *